(12) United States Patent
Kluck et al.

(10) Patent No.: US 10,113,628 B2
(45) Date of Patent: Oct. 30, 2018

(54) AXLE ASSEMBLY HAVING A CLUTCH COLLAR ACTUATOR MECHANISM

(71) Applicant: ArvinMeritor Technology, LLC, Troy, MI (US)

(72) Inventors: Robert D. Kluck, Chesterfield, MI (US); Nicholas S. Lakin, Rochester Hills, MI (US); Kristen G. Byrd, Dearborn, MI (US); Larry Wagle, Boyne Falls, MI (US); Dale Kwasniewski, Galesburg, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 511 days.

(21) Appl. No.: 14/822,958

(22) Filed: Aug. 11, 2015

(65) Prior Publication Data
US 2017/0045126 A1 Feb. 16, 2017

(51) Int. Cl.
| | |
|---|---|
| *F16H 48/24* | (2006.01) |
| *B60K 17/36* | (2006.01) |
| *F16H 48/00* | (2012.01) |
| *B60K 17/16* | (2006.01) |
| *F16D 11/10* | (2006.01) |
| *F16H 48/08* | (2006.01) |

(52) U.S. Cl.
CPC ............ *F16H 48/24* (2013.01); *B60K 17/16* (2013.01); *B60K 17/36* (2013.01); *F16D 11/10* (2013.01); *F16H 48/00* (2013.01); *F16H 48/08* (2013.01); *B60Y 2400/406* (2013.01); *B60Y 2400/421* (2013.01)

(58) Field of Classification Search
CPC ........... F16H 48/24; F16H 48/08; F16D 11/10
See application file for complete search history.

(56) References Cited

U.S. PATENT DOCUMENTS

| | | |
|---|---|---|
| 4,452,331 A | 6/1984 | Lunn et al. |
| 5,335,764 A | 8/1994 | Leitner et al. |
| 5,947,252 A | 9/1999 | Ziech |
| 6,386,348 B1 | 5/2002 | Kunii |
| 6,918,851 B2 | 7/2005 | Ziech et al. |
| 7,059,215 B1 | 6/2006 | Ziech |
| 7,211,017 B2 | 5/2007 | Green et al. |
| 2004/0204282 A1 | 10/2004 | Green et al. |
| 2012/0238394 A1 | 9/2012 | Valente et al. |

FOREIGN PATENT DOCUMENTS

| | | |
|---|---|---|
| CN | 203162039 U | 8/2013 |
| CN | 204372086 U | 6/2015 |
| EP | 0510457 A1 | 10/1992 |

(Continued)

OTHER PUBLICATIONS

Australia Government, IP Australia, Examination Report No. 1 for standard patent application for the corresponding Australia Patent Application No. 2016210754 dated Apr. 5, 2017.

(Continued)

*Primary Examiner* — Erin D Bishop
(74) *Attorney, Agent, or Firm* — Brooks Kushman P.C.

(57) ABSTRACT

An axle assembly having a clutch collar actuator mechanism. The clutch collar actuator mechanism may have a piston housing and a yoke that may move with respect to the piston housing. The piston housing may extend around the input shaft and may receive at least one piston. The yoke may connect the piston to the clutch collar.

20 Claims, 7 Drawing Sheets

(56) References Cited

FOREIGN PATENT DOCUMENTS

| EP | 1104714 A2 | 6/2001 |
|----|------------|--------|
| EP | 1130289 A2 | 9/2001 |
| EP | 0758590 B1 | 2/2005 |

OTHER PUBLICATIONS

European Patent Office, Partial European Search Report for the corresponding European Patent Application No. 16180942.1 dated Nov. 9, 2016.
Patent and Trademark Office, U.S. Appl. No. 14/719,977, filed May 22, 2015.
European Patent Office, Extended European search report for the corresponding European Patent Application No. 16180942.1 dated Mar. 31, 2017.
Chinese Patent Office, First Office Action for the corresponding Chinese application No. 201610595163.8, dated Apr. 3, 2018.

AXLE ASSEMBLY HAVING A CLUTCH COLLAR ACTUATOR MECHANISM

TECHNICAL FIELD

This patent application relates to an axle assembly having a clutch collar actuator mechanism.

BACKGROUND

An inter-axle differential lock shift mechanism is disclosed in U.S. Pat. No. 7,211,017.

SUMMARY

In at least one embodiment, an axle assembly is provided. The axle assembly may include a differential carrier, a cover, an input shaft, an interaxle differential unit, a clutch collar, a piston housing, and a yoke. The cover may be disposed on the differential carrier. The input shaft may extend through the cover. The clutch collar may be movably disposed on the input shaft. The piston housing may be disposed on the cover inside the differential carrier. The piston housing may have a first piston bore and a second piston bore. The first piston bore may receive a first piston. The second piston bore may receive a second piston. The yoke may connect the first piston and the second piston to the clutch collar. The clutch collar may move to an extended position to lock the interaxle differential unit when pressurized fluid is provided to the first and second piston bores to actuate the first and second pistons, respectively.

In at least one embodiment, an axle assembly is provided. The axle assembly may include an input shaft, an interaxle differential unit, a retainer, a clutch collar, and a biasing member. The input shaft may rotate about an axis. The retainer may have a retainer hole that may receive the input shaft. The clutch collar may be movably disposed on the input shaft. The clutch collar may have a clutch collar hole and an inner annular groove. The clutch collar hole may receive the input shaft. The inner annular groove may face toward the input shaft and may receive the retainer to inhibit axial movement of the retainer with respect to the clutch collar. The biasing member may be disposed between the retainer and the input shaft. The biasing member may exert a biasing force on the retainer that may urge the retainer and the clutch collar to move together along the axis away from the interaxle differential unit.

In at least one embodiment, an axle assembly is provided. The axle assembly may include a cover, an input shaft, a clutch collar, a piston housing, a yoke, a first yoke slide, and a second yoke slide. The input shaft may extend through the cover and may rotate about an axis. The clutch collar may be movably disposed on the input shaft. The piston housing may be disposed on the cover and may extend around the input shaft. The piston housing may have a first piston bore and a second piston bore. The first piston bore may receive a first piston. The second piston bore may receive a second piston. The yoke may connect the first piston and the second piston to the clutch collar. The first yoke slide and the second yoke slide may be disposed on the cover and may extend through the piston housing to the yoke. The yoke may slide along the first yoke slide and the second yoke slide.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
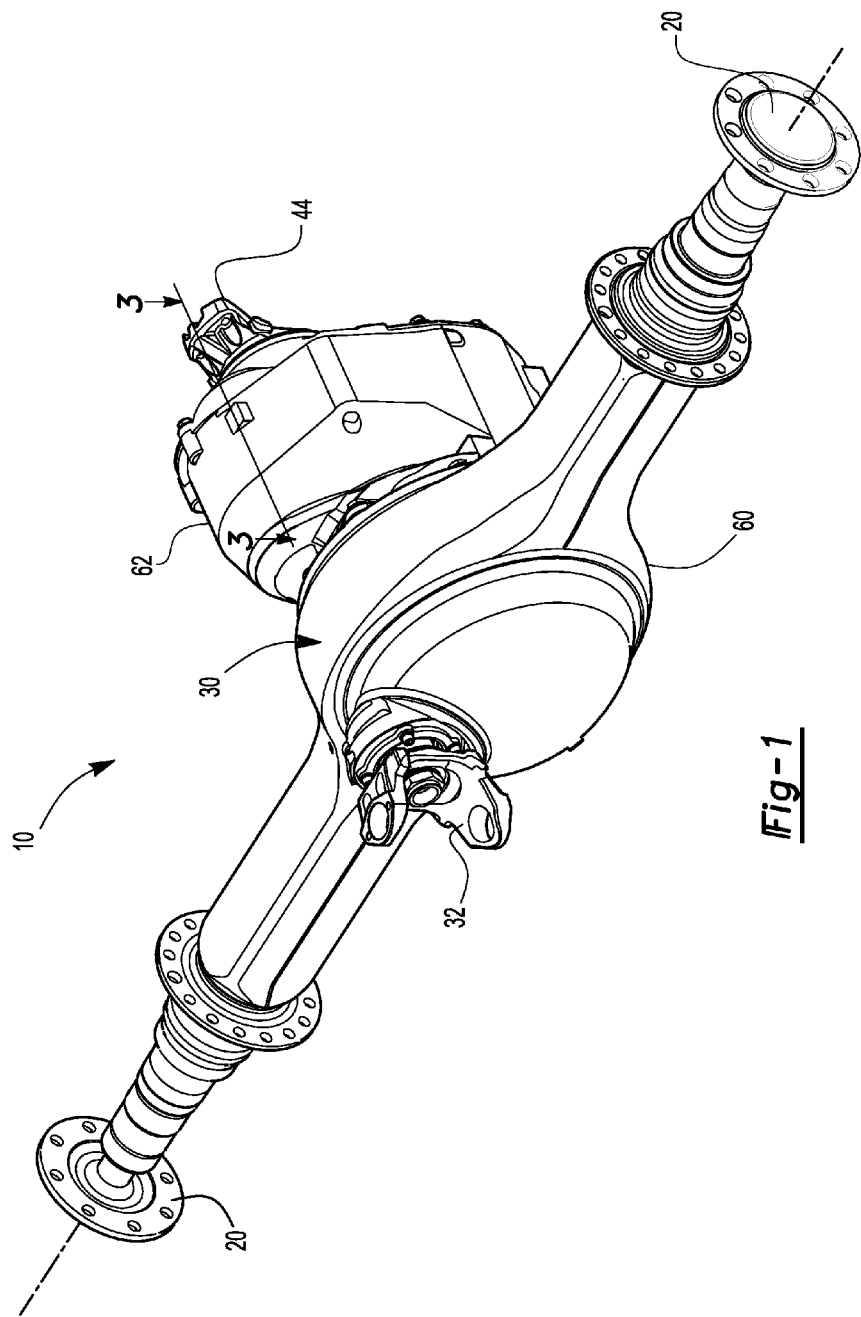
FIG. 1 is a perspective view of an axle assembly.

Referring to FIG. 1, an exemplary axle assembly 10 is shown. The axle assembly 10 may be provided with a vehicle, such as a motor vehicle like a truck, bus, farm equipment, military transport or weaponry vehicle, or cargo loading equipment for land, air, or marine vessels.

The axle assembly 10 may be a drive axle that may provide torque to one or more traction wheel assemblies that may include a tire mounted on a wheel. The drive axle may receive torque from a power source, such as an engine. For example, the power source may be operatively coupled to the input of a transmission and an output of the transmission may be coupled to an input of the axle assembly 10, such as with a drive shaft.

The axle assembly 10 may provide torque to a second axle assembly that may be connected in series with the axle assembly 10. For example, two axle assemblies may be provided in a tandem axle configuration. The first axle assembly or axle assembly that may be first in the series may be referred to as a forward-rear axle assembly. The second axle assembly may be referred to as a rear-rear axle assembly. An output of the first axle assembly may be selectively coupled to an input of the second axle assembly, such as with a prop shaft.

Figure 2:
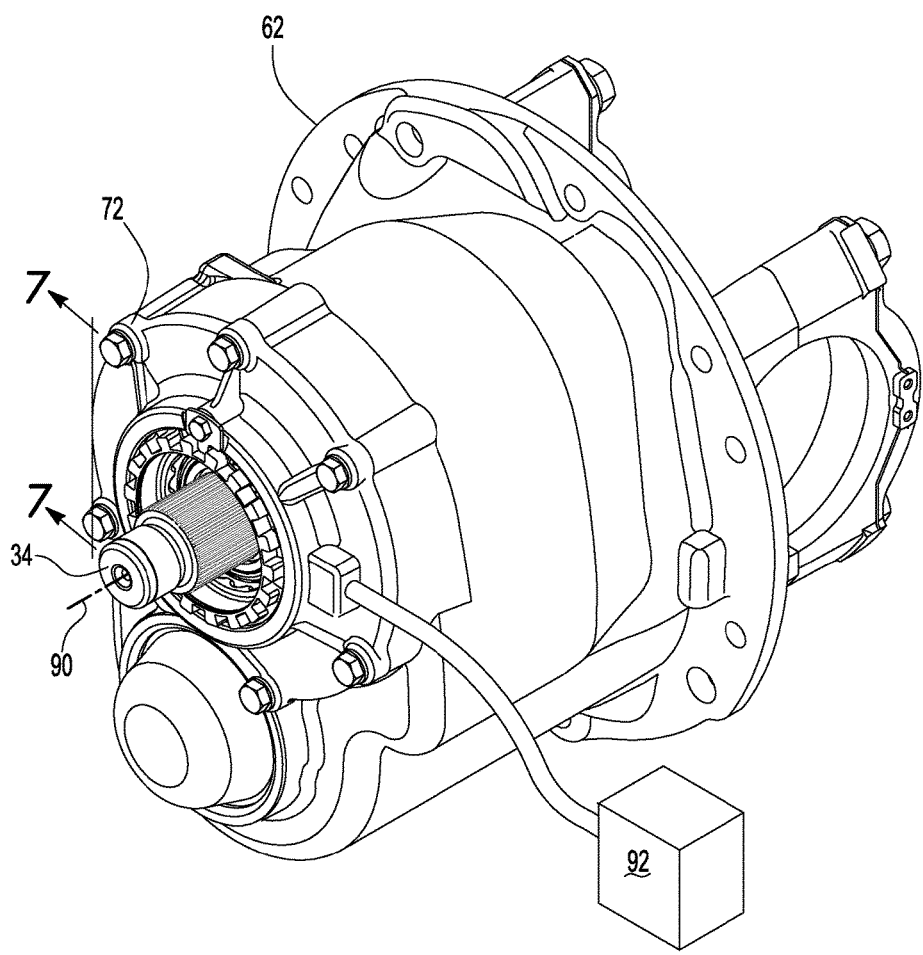
FIG. 2 is a perspective view of a differential carrier of the axle assembly.
Figure 3:
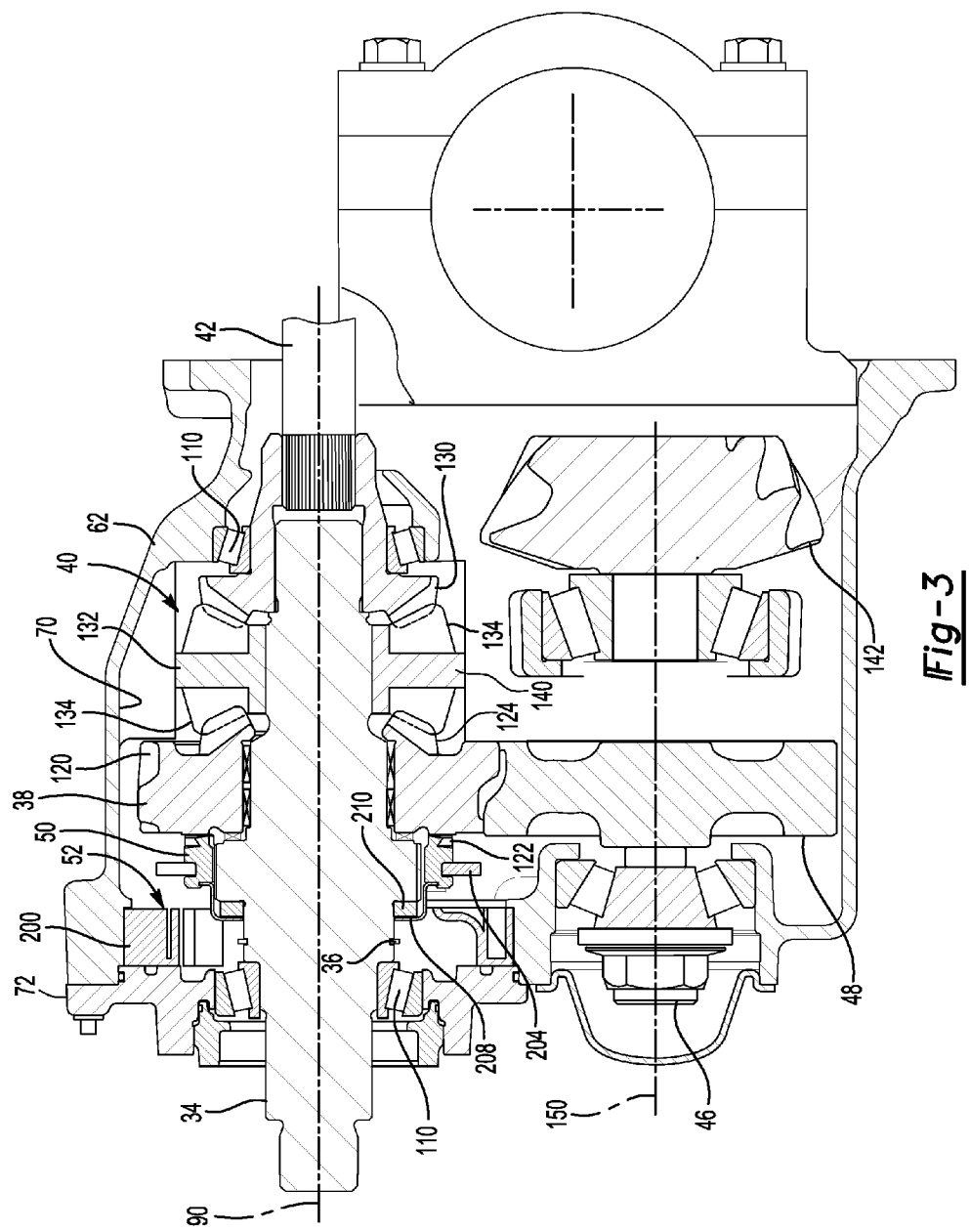
FIG. 3 is a section view along section line 3-3.

Referring to FIGS. 1-3, the axle assembly 10 is shown in more detail. The axle assembly 10 may include a housing assembly 30, an input yoke 32, an input shaft 34, a stop 36, a drive gear 38, an interaxle differential unit 40, an output shaft 42, an output yoke 44, a pinion 46, a driven gear 48, a clutch collar 50, and a clutch collar actuator mechanism 52.

Referring to FIG. 1, the housing assembly 30 may receive various components of the axle assembly 10. In addition, the housing assembly 30 may facilitate mounting of the axle assembly 10 to the vehicle. In at least one embodiment, the housing assembly 30 may include an axle housing 60 and a differential carrier 62.

The axle housing 60 may receive the axles 20 and may support the wheel assemblies. The axle housing 60 may include a center portion and a pair of arm portions. The center portion may be disposed proximate the center of the axle housing 60. The center portion may define an opening that may face toward the differential carrier 62 and may have a cavity that may receive at least a portion of a differential. The differential may be configured to transmit torque to its associated fraction wheel assemblies via the axles 20 and permit the traction wheel assemblies associated with the axle assembly 10 to rotate at different velocities. The arm portions may extend in opposite directions from the center portion and may each receive an axle 20.

The differential carrier 62 may be mounted on the axle housing 60. For example, the differential carrier 62 may be mounted on the center portion of the axle housing 60 with a plurality of fasteners, such as bolts. The differential carrier 62 may support the differential. As is best shown in FIG. 3, the differential carrier 62 may include an interior carrier surface 70 and a cover 72.

The interior carrier surface 70 may face toward the input shaft 34 and be disposed opposite an exterior surface of the differential carrier 62. As such, the interior carrier surface 70 may at least partially define an outer wall of the differential carrier 62 that forms the exterior of the differential carrier 62.

Figure 4:
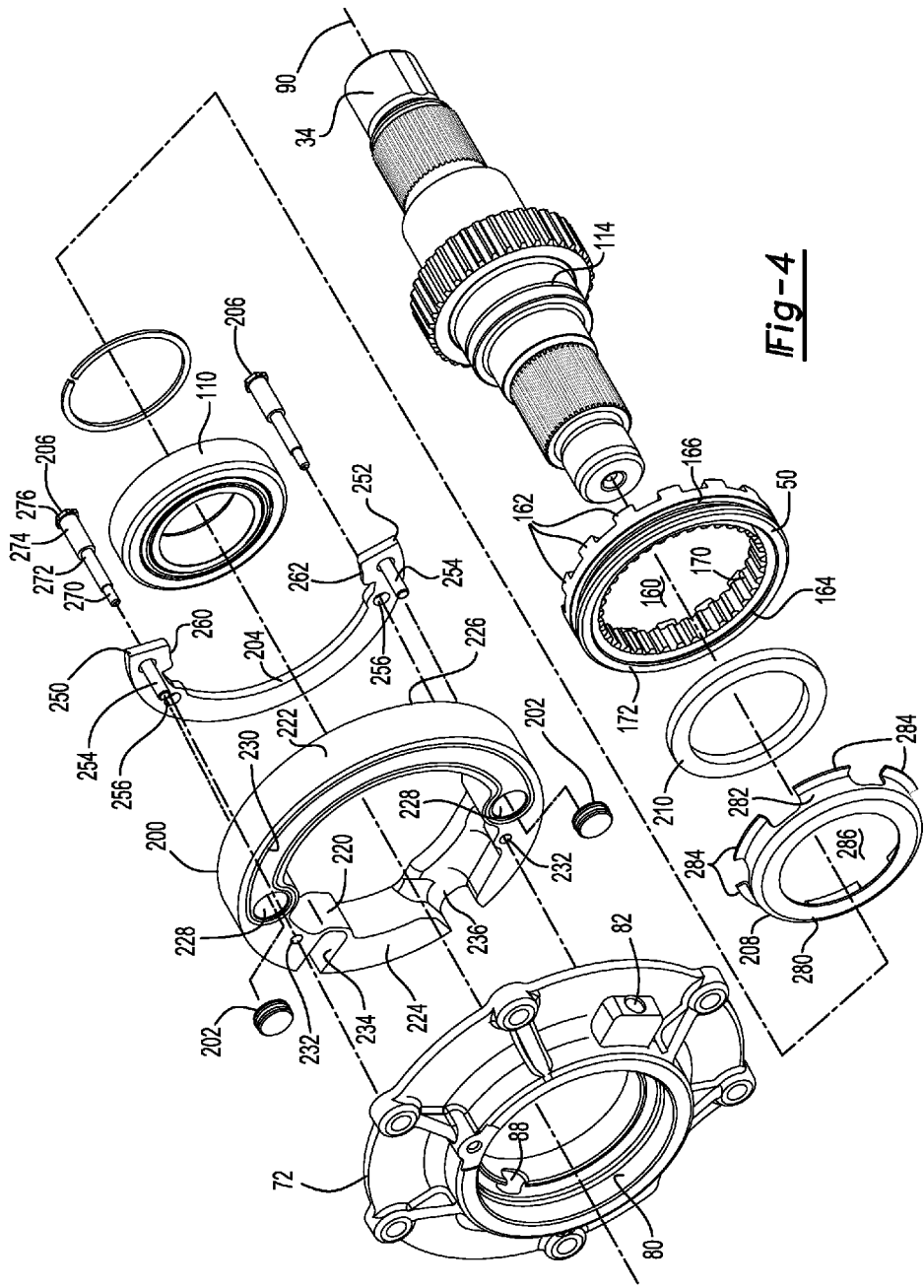
FIG. 4 is an exploded view of a portion of the axle assembly.

The cover 72 may be disposed on the differential carrier 62. For example, the cover 72 may be disposed at an end of the differential carrier 62 that may be disposed opposite the axle housing 60. The cover 72 may be fixedly disposed on the differential carrier 62 in any suitable manner, such as with one or more fasteners. As is best shown in FIGS. 4 and 5, the cover 72 may include a cover hole 80, a port 82, a fluid passage 84, one or more yoke slide mounts 86, and a cover lubricant passage 88.

The cover hole 80 may be a through hole that may extend through the cover 72. The cover hole 80 may receive the input shaft 34 and may extend around an axis 90. As such, the input shaft 34 may extend through the cover 72.

The port 82 may extend through the cover 72 to the fluid passage 84. The port 82 may provide pressurized fluid that may actuate the clutch collar actuator mechanism 52. For example, the port 82 may be fluidly connected to a pressurized fluid source 92 as is best shown in FIG. 2. The pressurized fluid source 92 may be configured to supply or store a volume of a pressurized fluid, such as a pressurized gas such as air. For example, the pressurized fluid source 92 may be a tank and/or a pump. In at least one embodiment, the port 82 may also allow pressurized fluid to be vented from the fluid passage 84.

Figure 5:
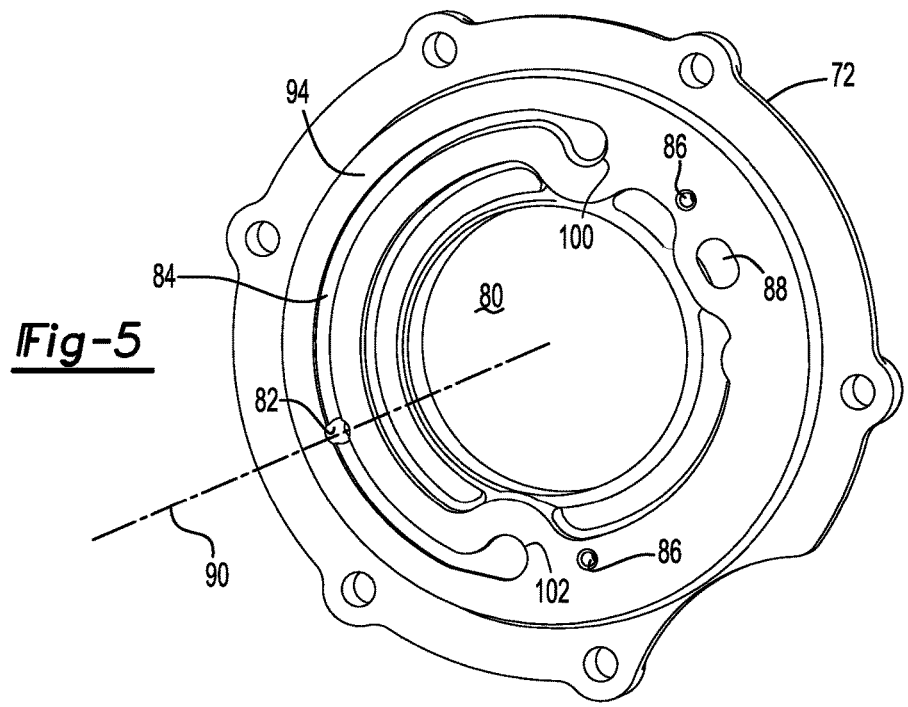
FIG. 5 is a perspective view of a cover.

Referring to FIG. 5, the fluid passage 84 may fluidly connect the port 82 to one or more piston bores that may be provided in a piston housing of the clutch collar actuator mechanism 52. In at least one embodiment, the fluid passage 84 may be configured as a groove or indentation that may be provided in the cover 72. For example, the fluid passage 84 may be provided along an interior side or interior surface 94 of the cover 72 that may face toward the clutch collar 50 and the clutch collar actuator mechanism 52. The fluid passage 84 may extend along a curve or an arc and may be generally radially disposed with respect to the axis 90. The fluid passage 84 may extend partially around the axis 90 between a first fluid passage end 100 and a second fluid passage end 102 that may be disposed opposite the first fluid passage end 100. The first fluid passage end 100 and the second fluid passage end 102 may be aligned with corresponding piston bores of the piston housing and may be enlarged or have a larger area or volume than an adjacent portion of the fluid passage 84. The first fluid passage end 100 and the second fluid passage end 102 may be disposed on opposite sides of the axis 90 from each other in one or more embodiments.

One or more yoke slide mounts 86 may be provided with the cover 72 to facilitate mounting of a corresponding yoke slide of the clutch collar actuator mechanism 52. The yoke slide mounts 86 may have any suitable configuration. For example, a yoke slide mount 86 may be configured as a hole or threaded hole that may be disposed proximate the interior surface 94 or may be provided in the interior surface 94. In FIG. 5, two yoke slide mounts 86 are shown that are spaced apart from the fluid passage 84 and that are disposed in the interior surface 94 proximate the first fluid passage end 100 and the second fluid passage end 102.

Referring to FIGS. 4 and 5, the cover lubricant passage 88 may help route a lubricant, such as oil, to components of the axle assembly 10. The cover lubricant passage 88 may be configured as a through hole that may extend from the cover hole 80 to the interior surface 94. The cover lubricant passage 88 may facilitate the flow of lubricant to moving components such as a roller bearing assembly 110 that may rotatably support the input shaft 34.

Referring to FIG. 1, the input yoke 32 may facilitate coupling of the axle assembly 10 to a torque source. For example, the input yoke 32 may be coupled to the drive shaft. The input yoke 32 may be disposed on the input shaft 34.

Referring to FIGS. 3 and 4, the input shaft 34 may extend along and may be configured to rotate about the axis 90. For example, the input shaft 34 may be rotatably supported by one or more roller bearing assemblies 110 that may be disposed on the housing assembly 30. The input shaft 34 may be operatively connected to the interaxle differential unit 40, which may be provided when the axle assembly 10 provides torque to another axle assembly. The input shaft 34 may include a stop groove 114 in one or more embodiments.

Figure 7:
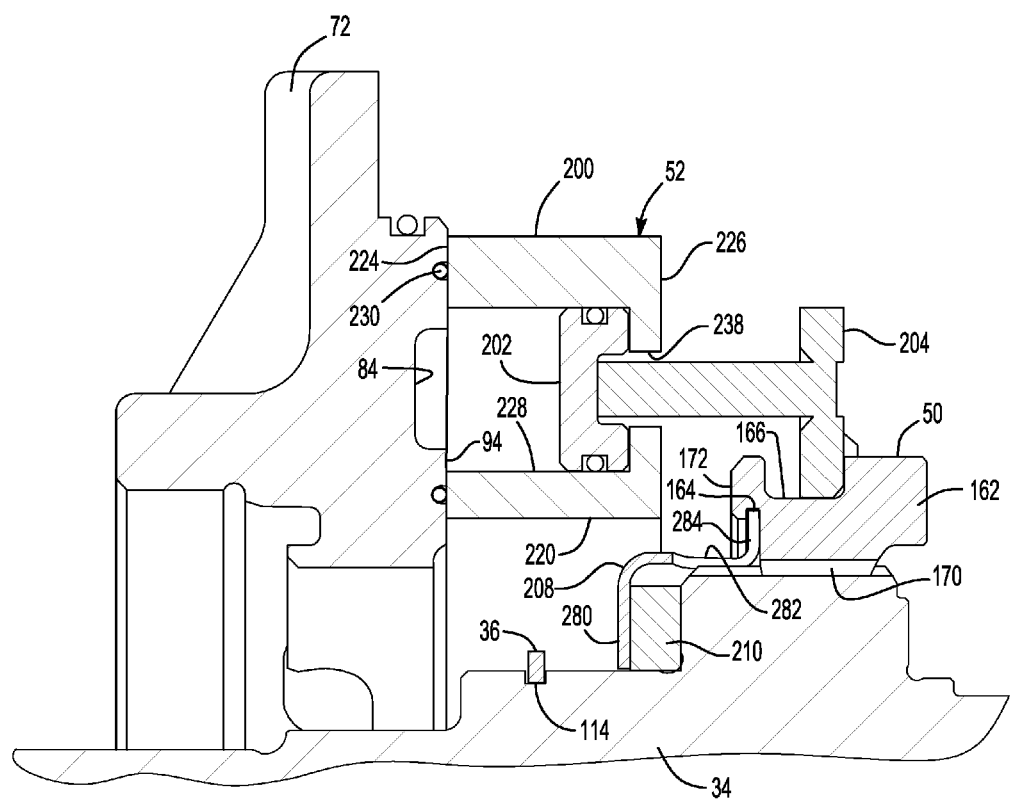
FIG. 7 is a section view of the axle assembly along section line 7-7.

The stop 36 may be fixedly positioned with respect to the input shaft 34. For example, the stop 36 may be configured to limit movement of the clutch collar 50 along the axis 90 in a first direction or to the left from the perspective shown in FIG. 3. The stop 36 may have any suitable configuration. For example, the stop 36 may be configured as one or more of protrusions that may extend from the input shaft 34 and away from the axis 90. As is best shown in FIGS. 4 and 7, the stop 36 may be configured as a ring, such as a snap ring that may extend around the axis 90 and may be received in the stop groove 114. The stop 36 may be disposed inside of a piston housing of the clutch collar actuator mechanism 52 and may be axially positioned between the cover 72 and a retainer of the clutch collar actuator mechanism 52 as will be discussed in more detail below.

Referring to FIG. 3, the drive gear 38 may be disposed proximate the input shaft 34. In at least one embodiment, the drive gear 38 may have a center bore that may receive a roller bearing that may be disposed on the input shaft 34 and that may rotatably support the drive gear 38. The roller bearing, if provided, may allow the drive gear 38 to rotate about or with respect to the input shaft 34 under certain operating conditions. The drive gear 38 may include an outer gear 120, a first face gear 122, and a second face gear 124.

The outer gear 120 may include a plurality of teeth that may engage and may mesh with teeth on the driven gear 48. For example, the teeth may be arranged around an outside diameter of the drive gear 38.

The first face gear 122 may include a set of teeth that may be arranged around the axis 90 on a side or face of the drive gear 38 that may face away from the interaxle differential unit 40 and toward the clutch collar 50. The teeth of the first face gear 122 may selectively engage teeth on the clutch collar 50 as will be discussed in more detail below.

The second face gear 124 may be disposed on an opposite side of the drive gear 38 from the first face gear 122. The second face gear 124 may include a set of teeth that may be arranged on a side or face of the drive gear 38 that faces toward the interaxle differential unit 40.

The interaxle differential unit 40 may compensate for speed differences between different drive axle assemblies, such as speed differences between the axle assembly 10 and a second axle assembly. The interaxle differential unit 40 may be provided in various locations. In FIG. 3, the interaxle differential unit 40 is disposed on the input shaft 34 adjacent to the drive gear 38; however, it is contemplated that the interaxle differential unit 40 may be provided in other locations, such as closer to the output yoke 44, and that the interaxle differential unit 40 may be disposed on a shaft other than the input shaft 34.

In FIG. 3, an exemplary interaxle differential unit configuration is shown that may include an output gear 130, a spider 132, and a plurality of pinion gears 134. It is to be understood that other interaxle differential unit configurations may be provided.

The output gear 130 may be disposed proximate the input shaft 34. For example, the output gear 130 may extend along the axis 90 and may have a center bore that may receive and/or support an end of the input shaft 34. The center bore may also include a spline or splined portion that may be spaced apart from the input shaft 34 and that may receive and engage a corresponding spline on another shaft, such as the output shaft 42. As such, the output gear 130 may not rotate about the axis 90 with respect to the output shaft 42.

The spider 132 may be fixedly disposed on the input shaft 34. For instance, the spider 132 may include a center bore that may include splines that may mate with corresponding splines on the input shaft 34 to help align and secure the spider 132 to the input shaft 34. As such, the spider 132 may rotate about the axis 90 with the input shaft 34. The spider 132 may also include one or more pins 140 that may extend away from the center bore of the spider 132.

The pinion gear 134 may be rotatably disposed on the pin 140. The pinion gear 134 may include teeth that may mate with the second face gear 124 of the drive gear 38 and may mate with teeth on the output gear 130.

The output shaft 42 may extend along and may be configured to rotate about the axis 90. For instance, the output shaft 42 may be supported by one or more roller bearings that may be disposed on the housing assembly 30. The output shaft 42 may be coupled to the interaxle differential unit 40. For example, the output shaft 42 may be fixedly coupled to the output gear 130.

Referring to FIG. 1, the output yoke 44 may facilitate coupling of the axle assembly 10 to another axle assembly. For instance, the output yoke 44 may be coupled to a connecting shaft, such as a prop shaft. The output yoke 44 may be fixedly coupled to the output shaft 42.

Referring to FIG. 3, the pinion 46 may be spaced apart from the input shaft 34 and may be configured to rotate about a second axis 150. The pinion 46 may rotate with the driven gear 48. A pinion gear head 142 may be disposed at an end of the pinion 46. The pinion gear head 142 may be integrally formed with the pinion 46 and may include a set of teeth that mate with corresponding teeth on a ring gear. The ring gear may be configured to rotate about a third axis and may be mounted to or may be operatively connected to the differential. Torque may be transmitted from the ring gear to the differential and from the differential to the axles 20.

The driven gear 48 may be disposed proximate the pinion 46. For example, the pinion 46 may be received in a center bore of the driven gear 48 and the driven gear 48 may be fixedly disposed on and may rotate with the pinion 46. The driven gear 48 may include a plurality of teeth that may be generally arranged about an outside diameter of the driven gear 48 and that may mate with the outer gear 120 of the drive gear 38.

Referring to FIGS. 3 and 4, the clutch collar 50, which may also be referred to as a lock collar, may be moveably disposed on the input shaft 34. The clutch collar 50 may move axially or move along the axis 90 between a retracted position and an extended position as will be discussed in more detail below. The clutch collar 50 may be generally ring-shaped and may include a clutch collar hole 160, a clutch collar face gear 162, an inner annular groove 164, and an outer annular groove 166.

The clutch collar hole 160 may extend through the clutch collar 50 and around the axis 90. The clutch collar hole 160 may receive the input shaft 34. For example, the clutch collar 50 may have a spline 170 that may extend into the clutch collar hole 160 and toward the axis 90 and may mate with corresponding spline on the input shaft 34. As such, the mating splines may allow the clutch collar 50 to move in an axial direction or along the axis 90 while inhibiting rotation of the clutch collar 50 about the axis 90 with respect to the input shaft 34.

The clutch collar face gear 162 may include a set of teeth that may face toward the interaxle differential unit 40. The set of teeth may be arranged around the axis 90 and may selectively engage the teeth of the first face gear 122 of the drive gear 38 depending on the position of the clutch collar 50 as will be discussed in more detail below.

The inner annular groove 164 may be disposed between the clutch collar face gear 162 and a first clutch collar face 172. The inner annular groove 164 may extend away from the axis 90 and may extend continuously around the axis 90 and around the clutch collar hole 160. As such, the inner annular groove 164 may face toward or may be open in a direction that faces toward the input shaft 34. As is best shown in FIG. 7, the inner annular groove 164 may be disposed further from the axis 90 than the spline 170 and may receive a retainer of the clutch collar actuator mechanism 52 as will be discussed in more detail below.

The outer annular groove 166 may be disposed between the clutch collar face gear 162 and the first clutch collar face 172. For example, the outer annular groove 166 may be disposed opposite the spline 170 such that the outer annular groove 166 may extend toward the axis 90 and may extend continuously around the axis 90 and the clutch collar 50. The outer annular groove 166 may receive a linkage, such as a yoke, that may operatively connect the clutch collar 50 to the clutch collar actuator mechanism 52 as will be discussed in more detail below.

Referring to FIGS. 3, 4, and 7, the clutch collar actuator mechanism 52 may be configured to actuate the clutch collar 50 in an axial direction or along the axis 90. In at least one embodiment, the clutch collar actuator mechanism 52 may include a piston housing 200, one or more pistons 202, a yoke 204, one or more yoke slides 206, a retainer 208, and a biasing member 210.

Figure 6:
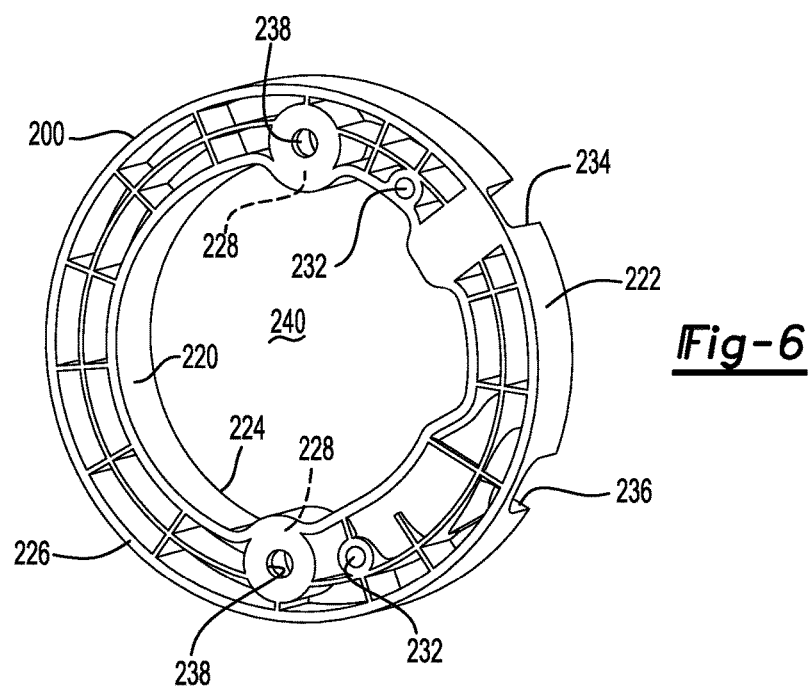
FIG. 6 is a perspective view of a piston housing.

The piston housing 200 may be disposed inside the housing assembly 30. For example, the piston housing 200 may be disposed inside the differential carrier 62 and may be disposed on the cover 72. As such, the differential carrier 62 may extend around the piston housing 200. As is best shown in FIGS. 3 and 6, the piston housing 200 may be configured as a ring that may extend around the input shaft 34 and the axis 90. In at least one embodiment, the piston housing 200 may have an inner surface 220, an outer surface 222, a first side surface 224, a second side surface 226, at least one piston bore 228, a seal 230, at least one yoke slide opening 232, a first lubricant passage 234, and a second lubricant passage 236.

The inner surface 220 may face toward the input shaft 34 and may extend around the axis 90. The inner surface 220 may at least partially define a piston housing hole 240 that may receive the input shaft 34, the stop 36, the retainer 208, and the biasing member 210.

The outer surface 222 may be disposed opposite the inner surface 220. The outer surface 222 may extend around the axis 90 and may be disposed proximate and may engage the differential carrier 62.

The first side surface 224 may face toward and may engage the cover 72.

The second side surface 226 may be disposed opposite the first side surface 224. As such, the second side surface 226 may be disposed opposite the cover 72 and may face toward the yoke 204.

At least one piston bore 228 may be provided in the piston housing 200. In FIG. 4, two piston bores 228 are shown; however, it is contemplated that a different number of piston bores 228 may be provided. The piston bore 228 may have a substantially cylindrical configuration and may extend from the first side surface 224 toward the second side surface 226. The piston bore 228 may receive a piston 202 such that the piston 202 may slide within the piston bore 228. As is best shown in FIG. 6, a piston rod hole 238 may be associated with each piston bore 228. For example, a piston rod hole 238 may extend from the second side surface 226 to a bottom surface of the piston bore 228 and may receive a piston rod as will be discussed in more detail below. The piston rod hole 238 may have a smaller diameter than the piston bore 228.

Referring to FIGS. 4 and 7, the seal 230 may be disposed between the cover 72 and the piston housing 200. For instance, the seal 230 may be disposed on the first side surface 224 and may engage the interior surface 94 of the cover 72 to inhibit leakage of pressurized fluid between the cover 72 and the piston housing 200. The seal 230 may extend around the piston bores 228 and may extend around the port 82 and the fluid passage 84 of the cover 72. As such, the seal 230 may have a generally C-shaped configuration. The seal 230 may be provided in any suitable manner. For example, the seal 230 may be overmolded onto the piston housing 200 may be provided as a separate component.

One or more yoke slide openings 232 may be provided in the piston housing 200. In FIGS. 4 and 6, two yoke slide openings 232 are shown; however, it is contemplated that a different number of yoke slide openings 232 may be provided. The yoke slide opening 232 may be a through hole that may extend through the piston housing 200 from the first side surface 224 to the second side surface 226. The yoke slide opening 232 may receive a yoke slide 206 and may be disposed outside of the seal 230.

The first lubricant passage 234 may extend from the outer surface 222 partially toward the inner surface 220. As is best shown in FIG. 4, the first lubricant passage 234 may be disposed outside of the seal 230 and between the piston bores 228. The first lubricant passage 234 may be aligned with the cover lubricant passage 88 of the cover 72. Lubricant may be routed to the first lubricant passage 234 via a channel or passage that may be provided in the housing assembly 30. The first lubricant passage 234 may provide lubricant to the cover lubricant passage 88, which in turn may provide lubricant to a roller bearing assembly 110 and a seal that may be disposed between the input shaft 34 and the cover 72.

The second lubricant passage 236 may be spaced apart from the first lubricant passage 234. As is best shown in FIG. 4, the second lubricant passage 236 may be disposed proximate the bottom of the piston housing 200 and may extend from the inner surface 220 to the outer surface 222. Lubricant may pass through the second lubricant passage 236 and may be directed to components that may be associated with pinion 46, such as associated roller bearing assemblies and the driven gear 48.

The yoke 204 may connect the pistons 202 to the clutch collar 50. As is best shown in FIG. 4, the yoke 204 may extend partially around the clutch collar 50 and may not extend completely around the axis 90. In at least one embodiment, the yoke 204 may include a first end portion 250, a second end portion 252, at least one piston rod 254, and at least one yoke hole 256.

The first end portion 250 may be disposed at an end of the yoke 204. For example, the first end portion 250 may be disposed proximate a first piston bore 228 and may have a first collar engagement feature 260. The first collar engagement feature 260 may couple the yoke 204 to the clutch collar 50 and may have any suitable configuration. For instance, the first collar engagement feature 260 may have a male configuration, a female configuration, or combinations thereof. As is best shown in FIG. 4, the first collar engagement feature 260 may extend toward the axis 90 and may be received in the outer annular groove 166 of the clutch collar 50.

The second end portion 252 may be disposed opposite the first end portion 250. For example, the second end portion 252 may be disposed proximate a second piston bore 228 and may have a second collar engagement feature 262. The second collar engagement feature 262 may couple the yoke 204 to the clutch collar 50 and may have any suitable configuration. For instance, the second collar engagement feature 262 may have a male configuration, a female configuration, or combinations thereof. As is best shown in FIG. 4, the second collar engagement feature 262 may extend toward the axis 90 and toward the first collar engagement feature 260 and may be received in the outer annular groove 166 of the clutch collar 50.

Referring to FIGS. 4 and 7, one or more piston rods 254 may extend through the piston housing 200 into a corresponding piston bore 228. For example, a piston rod 254 may extend through a piston rod hole 238 into a corresponding piston bore 228. A piston 202 may be disposed on a portion of the piston rod 254 that is disposed in the piston bore 228. In FIG. 4, two piston rods 254 are shown; however, it is contemplated that a different number of piston rods 254 may be provided. As is also shown in FIG. 4, the first piston rod 254 and a second piston rod 254 may be disposed proximate the first end portion 250 and the second end portion 252, respectively. The piston rod 254 may be fixedly positioned with respect to the yoke 204 and may be integrally formed with the yoke 204 in one or more embodiments.

Figure 8:
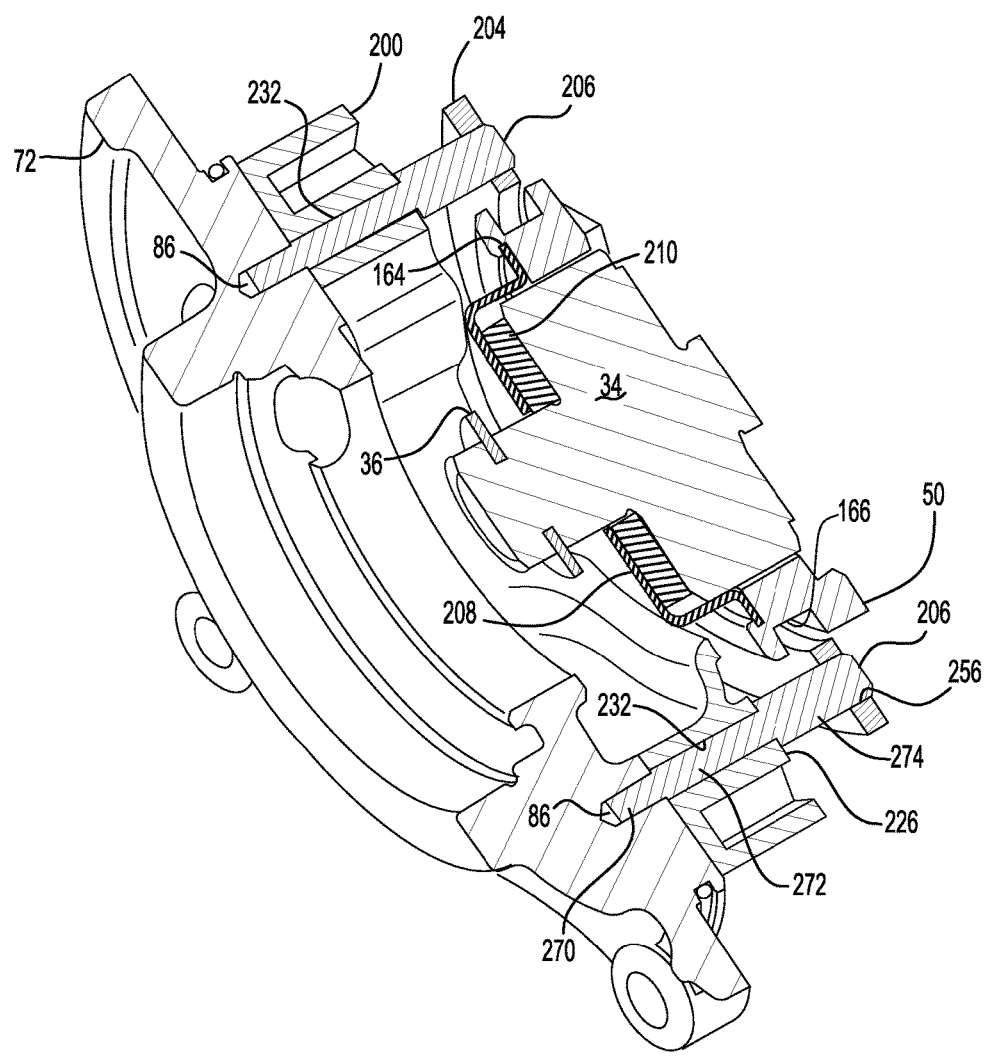
FIG. 8 is a section view of the axle assembly through first and second yoke slides.

Referring to FIGS. 4 and 8, one or more yoke holes 256 may extend through the yoke 204. A yoke hole 256 may receive a corresponding yoke slide 206 such that the yoke 204 may slide along the yoke slide 206. In the embodiment shown in FIG. 4, two yoke holes 256 are shown; however, it is contemplated that a different number of yoke holes 256 may be provided. As is also shown in FIG. 4, a first yoke hole 256 is located near the first end portion 250 while a second yoke hole 256 is located near the second end portion 252.

One or more yoke slides 206 may facilitate movement of the yoke 204 with respect to the piston housing 200. In addition, a yoke slide 206 may facilitate mounting of the piston housing 200 to the cover 72. In FIG. 4, two yoke slides 206 are shown; however, it is contemplated that a different number of yoke slides may be provided. A yoke slide 206 may extend along an axis that may extend substantially parallel to the axis 90 and may have one or more portions, such as a first portion 270, a second portion 272, a third portion 274, and a fourth portion 276.

The first portion 270 may be mounted to the cover 72. For example, the first portion 270 may be threaded and may be received in a yoke slide mount 86 of the cover 72.

The second portion 272 may be disposed between the first portion 270 and the third portion 274. The second portion 272 may have a larger diameter than the first portion 270 and may be received in a corresponding yoke slide opening 232 of the piston housing 200.

The third portion 274 may be disposed between the second portion 272 and the fourth portion 276. The third portion 274 may have a larger diameter than the second portion 272 and the yoke slide opening 232. As such, the third portion 274 may be disposed proximate and may engage the second side surface 226 of the piston housing 200 to inhibit axial and rotational movement of the piston housing 200 with respect to the cover 72. In addition, the third portion 274 may be received in a yoke hole 256 of the yoke 204 such that the yoke 204 may slide along the third portion 274 when the clutch collar 50 is actuated.

The fourth portion 276, if provided, may be disposed at an end of the yoke slide 206 adjacent to the third portion 274. The fourth portion 276 may be larger than at the third portion 274 and the yoke hole 256. As such, the fourth portion 276 may help retain the yoke 204 on the yoke slide 206 and may limit axial movement of the yoke 204 away from the piston housing 200.

Referring to FIGS. 4 and 7, the retainer 208 may be coupled to the clutch collar 50 and may help retain or secure the biasing member 210. For instance, the retainer 208 may be received in the inner annular groove 164 of the clutch collar 50 such that the inner annular groove 164 may inhibit axial movement of the retainer 208 with respect to the clutch collar 50. In at least one embodiment, the retainer 208 may include a first retainer wall 280, a second retainer wall 282, and one or more tabs 284.

The first retainer wall 280 may be disposed at an end of the retainer 208 and may be spaced apart from the clutch collar 50. The first retainer wall 280 may have a retainer hole 286 that may extend around the axis 90 and that may receive the input shaft 34. The first retainer wall 280 may engage the stop 36 to inhibit movement of the retainer 208 and the clutch collar 50 in the first direction or to the left from the perspective shown in FIG. 7.

The second retainer wall 282 may extend from the first retainer wall 280 toward the clutch collar 50. For example, the second retainer wall 282 may be radially disposed with respect to the axis 90 and may extend from an end of the first retainer wall 280 to a tab 284. As is best shown in FIG. 7, the second retainer wall 282 may be disposed between the inner surface 220 of the piston housing 200 and the biasing member 210.

One or more tabs 284 may couple the retainer 208 to the clutch collar 50. For example, one or more tabs 284 may extend from the second retainer wall 282 away from the axis 90 and into the inner annular groove 164.

The biasing member 210 may be disposed between the retainer 208 and the input shaft 34. For example, the biasing member 210 may extend from the first retainer wall 280 to the input shaft 34. The biasing member 210 may also be disposed between the input shaft 34 and the second retainer wall 282. The biasing member 210 may exert a biasing force on the retainer 208 that may urge the retainer 208 and the clutch collar 50 to move together along the axis 90 in a first direction and toward the stop 36. The biasing member 210 may have any suitable configuration. For example, the biasing member 210 may be configured as a spring, such as a wave spring coil spring or the like.

The clutch collar actuator mechanism 52 may actuate the clutch collar 50 between a retracted position and an extended position. In the retracted position, the clutch collar 50 may be disengaged from the drive gear 38 or may move in a first direction or to the left from the perspective and position shown in FIG. 7. More specifically, the clutch collar face gear 162 of the clutch collar 50 may be disengaged from the second face gear 124 of the drive gear 38 when in the retracted position. As such, the interaxle differential unit 40 may be unlocked and the input shaft 34 and the output shaft 42 may not rotate together about the axis 90 (i.e., the input shaft 34 and the output shaft 42 may rotate at different rotational velocities). The clutch collar 50 may be held in the retracted position by the biasing force exerted by the biasing member 210. In addition, the retainer 208 may engage the stop 36 when in the retracted position.

Referring to FIG. 7, the clutch collar actuator mechanism 52 is shown in the extended position. In the extended position, the clutch collar 50 may engage the drive gear 38. More specifically the clutch collar face gear 162 of the clutch collar 50 may engage the second face gear 124 of the drive gear 38. As such, the input shaft 34 and the output shaft 42 may rotate together about the axis 90. The clutch collar 50 may be actuated from the retracted position to the extended position when pressurized fluid is provided to one or more piston bores 228 to actuate one or more corresponding pistons 202. More specifically, the pistons 202 and the yoke 204 may move in a second direction and toward the drive gear 38 when sufficient force is exerted by the pressurized fluid on one or more pistons 202 to overcome the biasing force exerted by the biasing member 210. As such, the yoke 204, clutch collar 50, and retainer 208 may move together toward the drive gear 38 and the retainer 208 may be spaced apart from the stop 36. The clutch collar 50 may return to the refracted position when pressurized fluid is vented from the piston bores 228 such that the biasing member 210 may actuate the retainer 208 and the clutch collar 50.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
    a differential carrier;
    a cover disposed on the differential carrier;
    an input shaft that extends through the cover and is rotatable about an axis;

an interaxle differential unit disposed on the input shaft;
a clutch collar moveably disposed on the input shaft;
a piston housing that is disposed in the differential carrier on the cover, wherein the piston housing has a first piston bore that receives a first piston and a second piston bore that receives a second piston;
a yoke that connects the first piston and the second piston to the clutch collar; and
a first yoke slide and a second yoke slide that are disposed on the cover and extend through the piston housing to the yoke, wherein the yoke slides along the first yoke slide and the second yoke slide, and the clutch collar moves to an extended position to lock the interaxle differential unit when pressurized fluid is provided to the first piston bore and the second piston bore to actuate the first piston and the second piston.

2. The axle assembly of claim 1 wherein the piston housing extends around the input shaft and the differential carrier extends around the piston housing.

3. The axle assembly of claim 1 wherein the yoke extends partially around the clutch collar.

4. The axle assembly of claim 1 further comprising a seal that is disposed between the piston housing and the cover, wherein the seal extends around the first piston bore and the second piston bore.

5. The axle assembly of claim 4 wherein the piston housing includes an inner surface that faces toward the input shaft, an outer surface disposed opposite the inner surface, and a first lubricant passage that is disposed outside the seal and that extends from the outer surface partially toward the inner surface.

6. The axle assembly of claim 5 wherein the piston housing includes a second lubricant passage that extends from the inner surface to the outer surface and is disposed outside the seal between the first piston bore and the second piston bore.

7. The axle assembly of claim 1 wherein the first yoke slide and the second yoke slide couple the piston housing to the cover.

8. The axle assembly of claim 1 wherein the first yoke slide and the second yoke slide inhibit the piston housing from rotating about the axis.

9. The axle assembly of claim 1 wherein the yoke has a first yoke hole through which the first yoke slide extends and a second yoke hole through which the second yoke slide extends.

10. The axle assembly of claim 9 wherein the yoke extends partially around the clutch collar and has a first end portion, a second end portion disposed opposite the first end portion, a first piston rod disposed proximate the first end portion that extends through the piston housing to the first piston, and a second piston rod that extends through the piston housing to the second piston, wherein the first piston rod and the second piston rod are fixedly disposed on the yoke.

11. An axle assembly comprising:
a differential carrier;
a cover disposed on the differential carrier;
an input shaft that extends through the cover and is rotatable about an axis;
an interaxle differential unit disposed on the input shaft;
a clutch collar moveably disposed on the input shaft;
a piston housing that is disposed in the differential carrier on the cover, wherein the piston housing has a first piston bore that receives a first piston and a second piston bore that receives a second piston; and
a yoke that connects the first piston and the second piston to the clutch collar, wherein the yoke has a first piston rod that extends through the piston housing into the first piston bore and a second piston rod that extends through the piston housing into the second piston bore, wherein the first piston is disposed on the first piston rod and the second piston is disposed on the second piston rod and the clutch collar moves to an extended position to lock the interaxle differential unit when pressurized fluid is provided to the first piston bore and the second piston bore to actuate the first piston and the second piston.

12. The axle assembly of claim 11 wherein the yoke has a first end portion and a second end portion disposed opposite the first end portion, wherein the first piston rod is disposed proximate the first end portion and the second piston rod is disposed proximate the second end portion.

13. The axle assembly of claim 12 wherein the first end portion has a first collar engagement feature and the second end portion has a second collar engagement feature that extends toward and is spaced apart from the first collar engagement feature, wherein the first collar engagement feature and the second collar engagement feature couple the yoke to the clutch collar.

14. The axle assembly of claim 11 further comprising a first yoke slide and a second yoke slide that are disposed on the cover and extend through the piston housing to the yoke, wherein the yoke slides along the first yoke slide and the second yoke slide.

15. An axle assembly comprising:
a differential carrier;
a cover disposed on the differential carrier;
an input shaft that extends through the cover and is rotatable about an axis;
an interaxle differential unit disposed on the input shaft;
a clutch collar moveably disposed on the input shaft, wherein the clutch collar has a clutch collar hole that receives the input shaft and an inner annular groove that faces toward the input shaft, wherein the inner annular groove receives a retainer that has a retainer hole that receives the input shaft, wherein the inner annular groove inhibits axial movement of the retainer with respect to the clutch collar;
a piston housing that is disposed in the differential carrier on the cover, wherein the piston housing has a first piston bore that receives a first piston and a second piston bore that receives a second piston; and
a yoke that connects the first piston and the second piston to the clutch collar;
wherein the clutch collar moves to an extended position to lock the interaxle differential unit when pressurized fluid is provided to the first piston bore and the second piston bore to actuate the first piston and the second piston.

16. The axle assembly of claim 15 further comprising a stop that is disposed on the input shaft, wherein the stop limits movement of the retainer away from the interaxle differential unit.

17. The axle assembly of claim 16 wherein the retainer is spaced apart from the stop when the clutch collar engages the interaxle differential unit.

18. The axle assembly of claim 16 wherein the retainer includes a first retainer wall that extends around the input shaft, a second retainer wall that extends from the first retainer wall toward the clutch collar, and a tab that extends from the second retainer wall into the inner annular groove, wherein the first retainer wall engages the stop to inhibit movement of the retainer and the clutch collar.

19. The axle assembly of claim 18 further comprising a biasing member that is disposed between the retainer and the input shaft, wherein the biasing member exerts a biasing force on the retainer that urges the retainer and the clutch collar to move together along the axis away from the interaxle differential unit.

20. The axle assembly of claim 19 wherein the biasing member extends from the second retainer wall to the input shaft.

* * * * *